United States Patent [19]

Urabe et al.

[11] Patent Number: 4,653,867
[45] Date of Patent: Mar. 31, 1987

[54] LIQUID CRYSTAL DISPLAY APPARATUS

[75] Inventors: Tetsuo Urabe; Mikio Sugiki; Hiroya Usui, all of Kanagawa, Japan

[73] Assignee: Sony Corporation, Tokyo, Japan

[21] Appl. No.: 740,815

[22] Filed: Jun. 3, 1985

[30] Foreign Application Priority Data

Jun. 9, 1984 [JP] Japan .................................. 59-118651

[51] Int. Cl.$^4$ ................................................ G02F 1/3
[52] U.S. Cl. .................................... 350/351; 350/345
[58] Field of Search ........................ 350/351, 345, 352

[56] References Cited

U.S. PATENT DOCUMENTS 4,585,310 4/1986 Clecak et al. ..................... 350/351
4,595,260 6/1986 Kubota ................................ 350/351

Primary Examiner—Arthur G. Evans
Attorney, Agent, or Firm—Hill, Van Santen, Steadman & Simpson

[57] ABSTRACT

A liquid crystal display apparatus wherein laser beams which are modulated in accordance with modulating signals such as video signals are irradiated on a liquid crystal cell for writing the display image or picture on the cell. In the present invention, the laser beams emitted from two laser beam sources are combined at a polarization beam splitter with an angular offset between the respective optical axes equal to $\Delta\theta$, and the picture components corresponding to two scanning lines are simultaneously written into the liquid crystal cell during one scanning period, for increasing the image writing speed.

7 Claims, 7 Drawing Figures

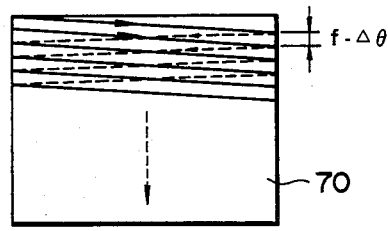
FIG.3
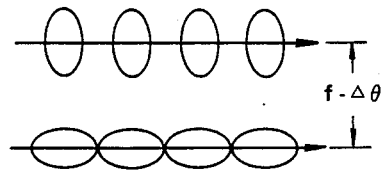
FIG.4
FIG.5
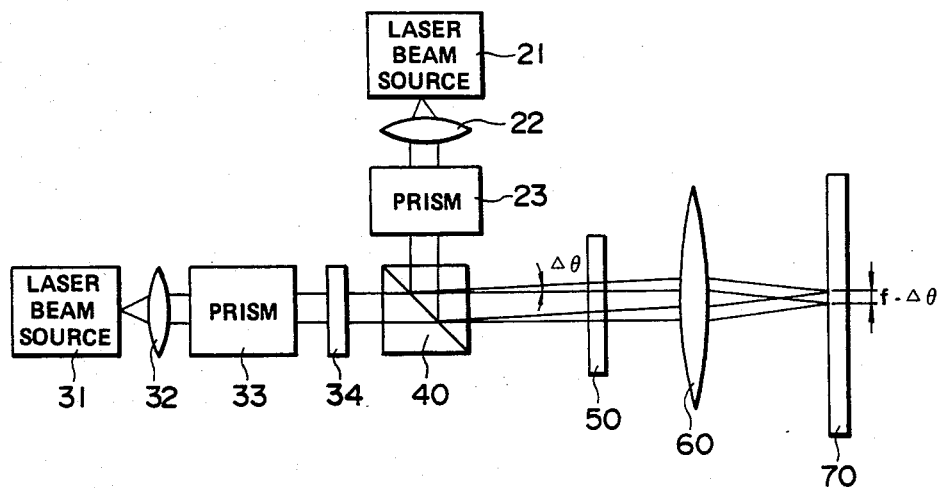

LIQUID CRYSTAL DISPLAY APPARATUS

BACKGROUND OF THE INVENTION

Field of the Invention

The present invention relates to a liquid crystal display apparatus wherein laser beams modulated by, for example, video signals, are irradiated on the surface of a liquid crystal cell for writing the display picture or image on the cell.

Cross-Reference To Related Applications

One of the applicants herein, Tetsuo Urabe, has been a sole or joint applicant in connection with previously filed copending applications dealing with liquid crystal display devices, being identified as U.S. Ser. Nos. 504,056, filed May 6, 1983; 530,596, filed July 18, 1983, and 603,748, filed Apr. 25, 1984.

Description of the Prior Art

In general, when a laser beam is irradiated on a liquid crystal cell so that the laser beam energy is converted into heat and applied in this form to the liquid crystal, the portion of the liquid crystal irradiated with the beam undergoes an abrupt rise in temperature, thus causing phase transition in the liquid crystal. However, as the liquid crystal is cooled rapidly with cessation of the laser beam irradiation, the liquid crystal reverts to its original phase while the molecular arrangement remains highly disrupted due to such rapid cooling. This state is maintained in a stable condition for a prolonged time. Thus, the image can be written into the liquid crystal cell with memory effects by irradiating the cell with a laser beam using a predetermined operation or sequence of operations. In addition, image writing means making use of the liquid crystal cell and the laser beam and optical projection means can be combined into a display apparatus wherein the image or picture obtained by the liquid crystal cell may be magnified and projected on a viewing screen.

A projection type display apparatus from the prior art is identified in FIG. 1, wherein a laser beam source 1 emits a laser beam modulated by video signals. This laser beam is collimated by a collimation lens 2 into a bundle of parallel beams which is then deflected downwardly in the drawing by a total reflection mirror 3 and caused to fall on a scanner 4. The scanner 4 is designed to scan the laser beam on a liquid crystal cell 7 both horizontally and vertically on the basis of the horizontal sync and vertical sync signals associated with the laser beam modulating signals. The construction and operation of the liquid crystal cell 7 will become apparent as the present description proceeds. The laser beam emitted from the scanner is directed through a focusing scanning lens 5 and a deflective mirror 6 onto the liquid crystal cell 7. The units designated 1 to 6 described above make up image writing means. The liquid crystal cell 7 is a three-layer structure consisting of a liquid crystal layer sandwiched between a pair of opposed transparent electrodes. The liquid crystal material is mixed with a coloring matter exhibiting a maximum absorption in the oscillating wavelength of the laser beam source 1.

When the laser beam falls on the liquid crystal cell 7, the laser beam is absorbed by the coloring matter mixed into the liquid crystal. In this case, the absorbed energy is converted into heat and the temperature of the liquid crystal molecules about the particles of the coloring matter is raised abruptly. This causes phase transition to take place so that the arrangement of the liquid crystal molecules is highly disrupted. As the liquid crystal cell is cooled rapidly, the disrupted state of the molecular arrangement is maintained. The image is written in this manner into the liquid crystal cell 7. The image written into the cell 7 can be erased by the application of an ac electrical field across the transparent electrodes which are disposed on both sides of the liquid crystal layer.

A projecting light source 8 is provided on the right-hand side of the cell 7 and the light from the source 8 is irradiated on the cell 7 by means of a schilieren lens 9 and a cold filter 10 that absorbs the light in the infrared wavelength range. A mask 11 forming a part of the schilieren optical system is placed on a focal point of the schilieren lens 9 and a projection lens 12 is placed so that its focal points are situated on the surfaces of the cell 7 and that of a projection screen 13, respectively. In this manner, an optical projection means is provided for projecting the magnified image once written on the liquid crystal cell 7.

It should be noted that the image is written into the liquid crystal cell 7 by the so-called raster scanning according to which the laser beam is caused to scan for example, from the upper left toward the upper right of the cell 7 by operation of the scanner 4 and the beam is returned to the upper left at a position slightly below the starting position for the first scanning so as to resume the scanning toward a position slightly below the terminal position for the first scanning. The operation is repeated in a preset number of times for completing each picture. The image is preferably written at a fast speed. In general, the display speed required of the display unit is 1 second per picture and a speed of 4 or more seconds per picture is considered to be practically unacceptable. The above described liquid crystal cell 7 suffers from the lower writing sensitivity so that writing a dot or picture element is time consuming and energy consuming and fast writing is achieved only with considerable difficulty. For example, even with the liquid crystal cell thought to have the highest sensitivity, the energy necessary in writing a dot amounts to 0.04 $\mu J$/dot. Assuming that the semiconductor laser unit with an output of 30 mW is used as the laser beam source, a pulse width of 1.3 microseconds per dot is required so that when the scanner 4 with a blanking period of 1 msec per each scanning is used, 2000×2000 dots corresponding to one picture can only be written in about 7 seconds.

For raising the writing speed, a laser beam source 1 with a larger output is used or the sensitivity of the liquid crystal cell 7 is increased. When a gas laser unit such as an $Ar^+$ laser unit is able to develop a large output, the apparatus using such a gas laser unit is undesirably increased in size. While the use of the semiconductor laser unit is desirable in this respect, the output of such laser with a proven operational reliability is low, on the order of 40 mW. In addition, the sensitivity of the cell 7 and the writing speed can be increased only with considerable difficulty.

SUMMARY OF THE INVENTION

The present invention seeks to overcome the aforementioned difficulties and to provide a liquid crystal display apparatus wherein the speed of writing the display image or picture on the liquid crystal cell with the aid of the laser beam irradiation may be increased.

Briefly, the present invention resides in a liquid crystal display apparatus comprising a liquid crystal cell having a liquid crystal layer between opposing electrodes, two laser beam sources emitting laser beams which are light modulated in accordance with predetermined signals, a polarization beam splitter combining the laser beams from the respective laser beam sources, a scanner for horizontally and vertically scanning the combined laser beams from the polarization beam splitter, and a scanning lens having a focal distance f adapted to converge the combined laser beams from the scanner on the liquid crystal cell. In accordance with the invention, the laser beams emitted from the laser beam sources are oriented so that they fall on the polarization beam splitter as S-polarized light and P-polarized light, with the optical axes of the laser beams combined at the polarization beam splitter being offset by an angle $\Delta\theta$ from each other, the laser beams being caused to scan on the liquid crystal cell by the scanner in such a manner that two image or picture components each corresponding to one scanning line are simultaneously written on the liquid crystal cell with the distance between the adjacent scanning lines being equal to $f \cdot \Delta\theta$.

BRIEF DESCRIPTION OF THE DRAWINGS

A further description of the present invention will be made in conjunction with the attached sheets of drawings in which:

FIG. 3 is a schematic view showing the state of the scanning laser beams in the liquid crystal display apparatus shown in FIG. 2;

FIG. 4 is a schematic view showing the configuration of the writing spots on the liquid crystal cell of the display apparatus shown in FIG. 2;

FIG. 5 is a diagram showing a modified embodiment of the liquid crystal display apparatus according to the present invention;

DESCRIPTION OF THE PREFERRED EMBODIMENTS

A liquid crystal display apparatus embodying the present invention will be described by reference to the accompanying drawings.

Figure 2:
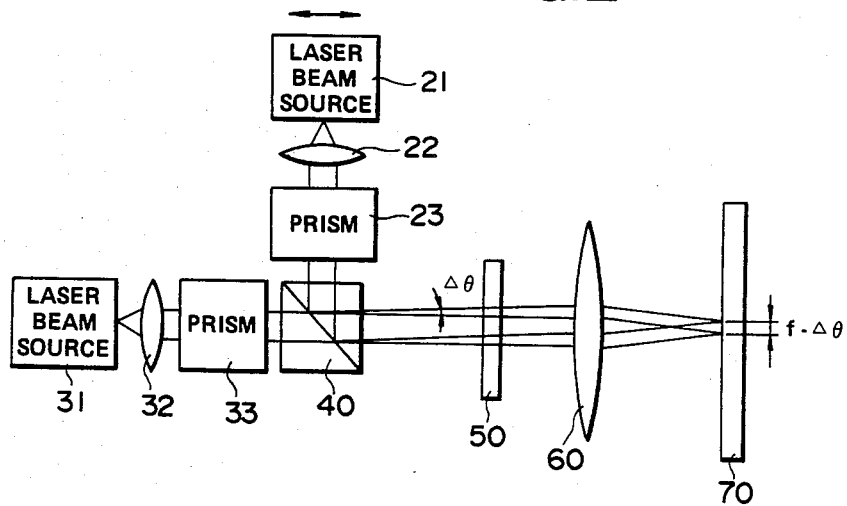
FIG. 2 is a diagram showing a liquid crystal display apparatus according to the present invention.
Figure 6:
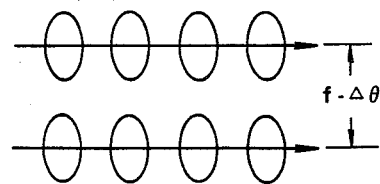
FIG. 6 is a schematic view showing the configuration of the writing spots on the liquid crystal cell of the display apparatus shown in FIG. 5.

A liquid crystal display apparatus according to a preferred embodiment of the invention is shown in FIG. 2 and is designed to write an image on a liquid crystal cell 70. Referring to FIG. 2, the laser beams which have been previously modulated by modulating signals such as video signals are emitted from laser beam sources 21, 31. The laser beam emitted from the laser beam source 21 is collimated by a collimation lens 22 into an elliptical bundle of parallel beams. These beams are converted from an elliptical bundle into a circular bundle by a prism 23 and are introduced as S-polarized light into a polarization beam splitter 40. Similarly, the laser beam emitted from the laser beam source 31 is collimated into an elliptical bundle of parallel beams which are then converted from the elliptical bundle into a circular bundle by a prism 33 and introduced as P-polarized light into the splitter 40. The laser beams from the sources 21 and 31 are combined in the polarization beam splitter 40. However, the optical axes of the combined laser beams exiting from the splitter 40 are not coincidental completely but are offset by an angle $\Delta\theta$ from each other as shown in FIG. 2. This is achieved by shifting the position of the laser beam source 21 as indicated by the arrows. Two laser beams whose optical axes are offset by the angle $\Delta\theta$ from each other are transmitted to a scanner 50 whereby the laser beams are caused to scan on the liquid crystal cell 70 horizontally and vertically on the basis of horizontal and vertical sync signals included with the modulating signal. The two laser beams are converged by a scanning lens 60 on the surface of the liquid crystal cell 70 at discrete points from each other with a distance equal to $f \cdot \Delta\theta$, where f stands for the focal distance of the scanning lens 60 and may, for example, be 50 mm.

It will be realized that the liquid crystal cell 70 is of the three-layer structure type comprising a liquid crystal material sandwiched between two opposing transparent electrodes. The liquid crystal material consists of a smectic phase material or a cholesteric phase material or mixtures thereof, which are mixed with a coloring matter exhibiting a maximum light absorption in the oscillation wavelength range of the laser beam sources 21, 31. Although cylindrical lenses may be used as prisms 23, 33, to avoid possible aberrations, it is preferable to use anamorphic prisms. For converging the two laser beams on two discrete points on the surface of the liquid crystal 70 spaced by a distance $f \cdot \Delta\theta$ from each other, the two laser beams 21, 31 may be arranged with their optical axes substantially parallel to each other. However, this in effect is not desirable because then the laser beam sources 21, 31 need to be positioned at some large distance from the liquid crystal cell 70.

Figure 1:
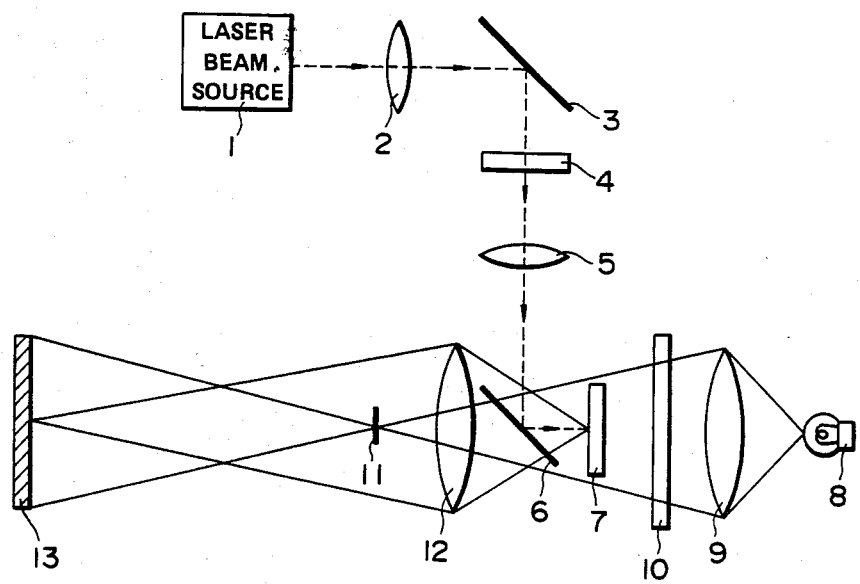
FIG. 1 is a diagram illustrating an example of a prior art projection type display apparatus.

In the above described liquid crystal display apparatus, the laser beam from the laser beam source 21 and the laser beam from the laser beam source 31 may be caused to scan on the liquid crystal 70 simultaneously with the distance between the two laser beams being equal to $f \cdot \Delta\theta$, as shown in FIG. 3. By setting the distance $f \cdot \Delta\theta$ so as to be equal to the distance between adjacent scanning lines, e.g. about 8 microns, picture components corresponding to two channel signals or two scanning line signals can be simultaneously written on the liquid crystal cell 70 during one scanning line interval. Consequently, even if the scanning speed of the scanner 50, the output of the laser beam sources 21, 31 and the sensitivity of the liquid crystal cell 70 are the same as those in conventional liquid crystal display apparatus, the image writing speed can be twice that of the conventional apparatus. The image once written on the cell 70 can be erased by applying an ac field across the two transparent electrodes placed on both sides of the liquid crystal layer. The light transmitting projection type display apparatus shown in FIG. 1 may be designed with the use of the above described liquid crystal display apparatus.

It should be noted that the semiconductor laser units with outputs on the order of 30 to 40 mW that are lower than those of the gas laser units, may be employed as the laser beam sources 21, 31. However, in a semiconductor laser unit, there is a certain relation between the direction of light polarization and the anisotropy of the laser beam divergence angle so that the writing spots on the liquid crystal 70 tend to become elliptical in cross section and the long and short axes of the spots are displaced 90° to each other as shown in FIG. 4. This situation could be avoided if the section of each of the laser beams exiting from the prisms 23, 33 would be shaped to a true circle. In such a situation, a λ/2 plate 34 can be inserted between the polarization beam splitter 40 and the prism 33 corresponding to one of the laser beam sources, in this embodiment the laser beam source 31, as shown in FIG. 5, thereby causing the direction of the light polarization to be rotated by 90° for aligning the directions of the long and short axes of the respective writing spots.

Figure 7:
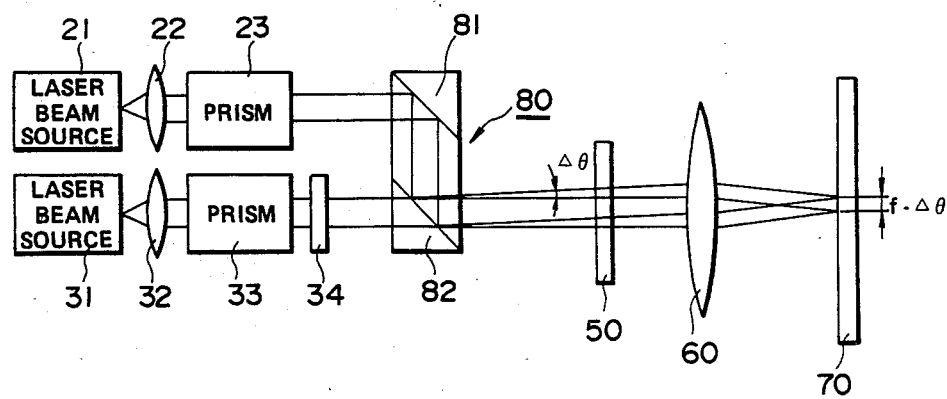
FIG. 7 is a diagram showing another modified embodiment of the liquid crystal display apparatus according to the present invention.

If the beam splitter 40 is displaced or tilted by some reason or other, the image forming positions on the liquid crystal cell 70 of the respective writing spots of the laser beams from the laser beam sources 21, 31, are affected in such a manner that a deviation is caused in the relative position of the writing spots. This can be compensated for by using a so-called laminate mirror 80 which consists of a mirror 81 and a polarization beam splitter 82 bonded to each other as shown in FIG. 7 in such a manner that the laser beam from the laser beam source 21 is conveyed to the splitter 82 through the mirror 81 and the laser beam from the laser beam source 31 is conveyed directly to the splitter 82. In this case, even if the laminate mirror 80 is rotated or tilted slightly by some reason, the optical axes of the two laser beams exiting from the laminate mirror are always offset by $\Delta\theta$ so that the relative position of the writing spots on the liquid crystal cell 70, viz. the distance $f\cdot\Delta\theta$ can be set at all times to a constant value, thus assuring accurate image writing.

From the foregoing, it will be seen that the two laser beam sources 21, 31 are used in the embodiments of the liquid crystal display apparatus of the present invention and the laser beams from these sources 21, 31 are combined with an angular offset $\Delta\theta$ between the respective optical axes by the polarization beam splitter 40 or 82 in such a manner that the image components corresponding to the two scanning lines can be simultaneously written into the liquid crystal cell 70 during one scanning period. In this manner, the image writing speed into the liquid crystal cell 70 is doubled as compared to the conventional system without increasing the scanning speed of the scanner 50, the output of the laser beam sources 21, 31 or the sensitivity of the liquid crystal cell 70. Also, a low speed scanner such as a galvanometer type scanner can be used as the scanner 50.

In the described embodiments, the coloring matter is added to the liquid crystal material of the cell 70 so as to promote absorption of the laser beam from the laser beam sources 21, 31. Further, an absorption layer such as cadmium tellurium can be used in place of adding coloring matter. In this case, the display apparatus can be applied to the light reflecting type projection display apparatus.

It should be evident that various modifications can be made to the described embodiments without departing from the scope of the present invention.

We claim as our invention:

1. A liquid crystal display apparatus comprising:
   a liquid crystal cell including a liquid crystal layer between opposed electrodes,
   a pair of laser beam sources emitting laser beams which are light-modulated in accordance with predetermined signals,
   a pair of orienting means for converting one of said laser beams into S-polarized light and the other of said laser beams into P-polarized light,
   a polarization beam splitter combining the two thus oriented laser beams,
   the optical axes of the laser beams being combined at said polarization beam splitter being offset by an angle $\Delta\theta$ from each other,
   a scanner for horizontally and vertically scanning the combined laser beams from the polarization beam splitter,
   a scanning lens having a focal distance f positioned to converge the combined laser beams from said scanner on said liquid crystal cell,
   said laser beams scanning the liquid crystal cell such that two image components each corresponding to one scanning line are simultaneously written on said liquid crystal cell with the distance between the adjacent scanning lines being equal to $f\cdot\Delta\theta$.

2. An apparatus according to claim 1 in which said orienting means comprises the combination of a collimating lens and a prism.

3. An apparatus according to claim 1 which includes a λ/2 plate interposed between one of said orienting means and said polarization beam splitter in one of said laser beams for rotating the direction of the light polarization by 90° before it strikes said liquid crystal cell.

4. An apparatus according to claim 1 which includes a laminate mirror composed of said polarization beam splitter and a mirror operatively associated therewith, said laminate mirror intercepting a laser beam emitted from one of said sources to direct the same onto said polarization beam splitter.

5. A method of operating a liquid crystal display device which comprises:
   providing a pair of laser beams light-modulated in accordance with predetermined signals,
   converting one of said laser beams into S-polarized light and the other of said beams into P-polarized light, the two beams being offset by an angle $\Delta\theta$,
   combining the two offset beams in a polarization beam splitter,
   horizontally and vertically scanning the combined laser beams from said polarization beam splitter,
   converging the combined laser beams with a scanning lens having a focal distance f onto a liquid crystal cell such that two image components each corresponding to one scanning line are simultaneously written on said liquid crystal cell, the distance between adjacent scanning lines being equal to $f\cdot\Delta\theta$.

6. A method according to claim 5 which includes the step of rotating the direction of polarization of one of said laser beams by 90° before it strikes said liquid crystal cell.

7. A method according to claim 5 wherein the offset of said beams is accomplished by moving one of the laser beam sources relative to the other.

* * * * *